US012316004B2

(12) United States Patent
Hasegawa

(10) Patent No.: US 12,316,004 B2
(45) Date of Patent: May 27, 2025

(54) ARRAY ANTENNA DEVICE

(71) Applicant: Fujikura Ltd., Tokyo (JP)

(72) Inventor: Yuta Hasegawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 18/273,889

(22) PCT Filed: Nov. 9, 2022

(86) PCT No.: PCT/JP2022/041645
§ 371 (c)(1),
(2) Date: Jul. 24, 2023

(87) PCT Pub. No.: WO2023/203798
PCT Pub. Date: Oct. 26, 2023

(65) Prior Publication Data

US 2024/0396226 A1 Nov. 28, 2024

(30) Foreign Application Priority Data

Apr. 22, 2022 (JP) ................................ 2022-071014

(51) Int. Cl.
*H01Q 21/00* (2006.01)
*H01Q 1/48* (2006.01)

(52) U.S. Cl.
CPC ........... *H01Q 21/0006* (2013.01); *H01Q 1/48* (2013.01)

(58) Field of Classification Search
CPC .... H01Q 21/0006; H01Q 1/48; H01Q 9/0457; H01Q 21/065
See application file for complete search history.

(56) References Cited

U.S. PATENT DOCUMENTS 5,977,924 A * 11/1999 Takei .................. H01Q 21/068 343/770
11,283,150 B2 * 3/2022 Arai .................... H01Q 1/2208
(Continued)

FOREIGN PATENT DOCUMENTS

JP H03055904 A 3/1991
JP 3-101507 A 4/1991
(Continued)

OTHER PUBLICATIONS

International Search Report dated Jan. 17, 2023, issued in counterpart International Application No. PCT/JP2022/041645. (2 pages).

*Primary Examiner* — Seung H Lee
(74) *Attorney, Agent, or Firm* — WHDA, LLP

(57) ABSTRACT

In an array antenna device, a third power supply line includes an extension portion, a first branch line overlapping a first slot and a second branch line overlapping a second slot in a plan view, the first branch line and the second branch line branching from an extension portion. The length of the first branch line up to the first slot is equal to the length of the second branch line up to the second slot. In a plan view, a direction in which a tip end portion of the first branch line enters the first slot is opposite to a direction in which the extension portion extends in the first direction. In a plan view, a direction in which a tip end portion of the second branch line enters the second slot is opposite to a direction in which the extension portion extends in the first direction.

6 Claims, 6 Drawing Sheets

(56) References Cited

U.S. PATENT DOCUMENTS

| | | | | |
|---|---|---|---|---|
| 2019/0245275 | A1* | 8/2019 | Hayashi | H01Q 1/52 |
| 2020/0266543 | A1 | 8/2020 | Kaushal et al. | |
| 2020/0313282 | A1* | 10/2020 | Jia | H01Q 5/378 |
| 2021/0075112 | A1* | 3/2021 | Shailendra | H01Q 21/0037 |
| 2022/0209411 | A1* | 6/2022 | Che | H01Q 1/523 |

FOREIGN PATENT DOCUMENTS

| | | | |
|---|---|---|---|
| JP | 7-183724 | A | 7/1995 |
| JP | 2015-41995 | A | 3/2015 |
| JP | 2019-57890 | A | 4/2019 |
| JP | 2021-57705 | A | 4/2021 |

* cited by examiner

ARRAY ANTENNA DEVICE

TECHNICAL FIELD

The present invention relates to an array antenna device. Priority is claimed on Japanese Patent Application No. 2022-071014, filed on Apr. 22, 2022, the content of which is incorporated herein by reference.

BACKGROUND ART

The following Patent Document 1 discloses an array antenna substrate in which a plurality of antenna elements is arranged in a plane direction of a dielectric substrate. The array antenna substrate includes a power distribution wiring (power supply line) that supplies power to each antenna element.

CITATION LIST

Patent Document

[Patent Document 1]

Japanese Unexamined Patent Application, First Publication No. 2019-57890

SUMMARY OF INVENTION

Technical Problem

Incidentally, in a case where the power supply line is linearly extended and each antenna element is connected in series, the phase supplied with power to each antenna element changes depending on the frequency such that the direction in which the strongest radiation occurs changes depending on the frequency. Furthermore, in a case where the power supply line is branched and bent to connect each antenna element in parallel, there is a possibility that when the routing of the power supply line is congested, bending the power supply line may cause electromagnetic interference with either its own power supply line in close proximity or the power supply line in the adjacent row.

In the array antenna device, deterioration of antenna characteristics due to the layout of the power supply lines is likely to occur.

The present invention has been made in view of the above circumstances, and an object of the present invention is to improve the antenna characteristics of an array antenna device.

Solution to Problem

An array antenna device according to the first aspect of the present invention includes an antenna layer, a ground layer, and a feed line layer, in which the antenna layer, the ground layer, and the feed line layer are stacked in this order, with a dielectric layer sandwiched between the antenna layer and the ground layer, and a dielectric layer sandwiched between the ground layer and the feed line layer. A first antenna element, a second antenna element, a third antenna element, and a fourth antenna element are arranged in the antenna layer in this order in a first direction in a plan view, and an antenna element row includes the first antenna element, the second antenna element, the third antenna element, and the fourth antenna element. The first antenna element and the second antenna element are connected via a first power supply line extending in the first direction. The third antenna element and the fourth antenna element are connected via a second power supply line extending in the first direction.

A first slot and a second slot are formed in the ground layer, the first slot overlaps the first power supply line and the first slot being formed equidistant from the first antenna element and the second antenna element, in a plan view, and the second slot overlaps the second power supply line and the second slot being formed equidistant from the third antenna element and the fourth antenna element, in a plan view.

A third power supply line is formed in the feed line layer, the third power supply line is electromagnetically coupled to the first power supply line via the first slot, the third power supply line is electromagnetically coupled to the second power supply line via the second slot, and the third power supply line supplies power to each antenna element of the antenna element row, the third power supply line includes an extension portion extending in the first direction along the antenna element row, a first branch line overlapping the first slot and a second branch line overlapping the second slot in a plan view, the first branch line and the second branch line branch from the extension portion, A length of the first branch line up to the first slot is equal to a length of the second branch line up to the second slot, in a plan view, the direction in which a tip end portion of the first branch line enters the first slot is opposite to the direction in which the extension portion extends in the first direction, and in a plan view, a direction in which a tip end portion of the second branch line enters the second slot is opposite to a direction in which the extension portion extends in the first direction.

According to this configuration, by branching the third power supply line extending in the first direction along the antenna element row in the feed line layer so as to pass through each slot before folding back, the routing of the power supply line is simplified, and the power can be supplied to each slot equidistantly and in the same direction. In the antenna layer, the power is supplied to the separate antenna elements in opposite directions at branches from each slot. As a result, since the power is supplied in parallel to all the antenna elements, it is possible to supply the power to the antenna elements in the same phase at all frequencies, so that the antenna characteristics are improved.

According to a second aspect of the present invention, in the array antenna device of the first aspect, the extension portion of the third power supply line may be arranged on a first side of a second direction intersecting the first direction in a plan view, with respect to the antenna element row.

According to a third aspect of the present invention, in the array antenna device of the second aspect, the first branch line may include a first straight line portion extending from a branch position with the second branch line to a first side of the first direction, which is the same direction where the extension portion extends, a second straight line portion bending and extending to a second side of the second direction with respect to the first straight line portion, and a third straight line portion bending and extending from the second straight line portion to a second side of the first direction, and the second branch line may include a fourth straight line portion bending and extending from the branch position to the second side of the second direction with respect to the extension portion, and a fifth straight line portion bending and extending from the fourth straight line portion to the second side of the first direction.

According to a fourth aspect of the present invention, in the array antenna device of the third aspect, the length of the second straight line portion may be equal to the length of the fourth straight line portion, and the total length of the first straight line portion and the third straight line portion may be equal to the length of the fifth straight line portion.

According to a fifth aspect of the present invention, in the array antenna device of any one of the first to fourth aspects, in a plan view, the tip end portion of the first branch line may extend across the first slot, and the tip end portion of the second branch line may extend across the second slot, and the length of a tip of the first branch line from across the first slot may be equal to the length of a tip of the second branch line from across the second slot.

According to a sixth aspect of the present invention, in the array antenna device of any one of the first to fifth aspects, a plurality of antenna row structures including the antenna element row, the first power supply line, the second power supply line, the first slot, the second slot, and the third power supply line may be arranged in parallel in a plan view.

Advantageous Effects of Invention

According to the above aspects of the present invention described above, it is possible to improve the antenna characteristics of the array antenna device.

DESCRIPTION OF EMBODIMENTS

Hereinafter, an embodiment of the present invention will be described with reference to the drawings.

Figure 1:
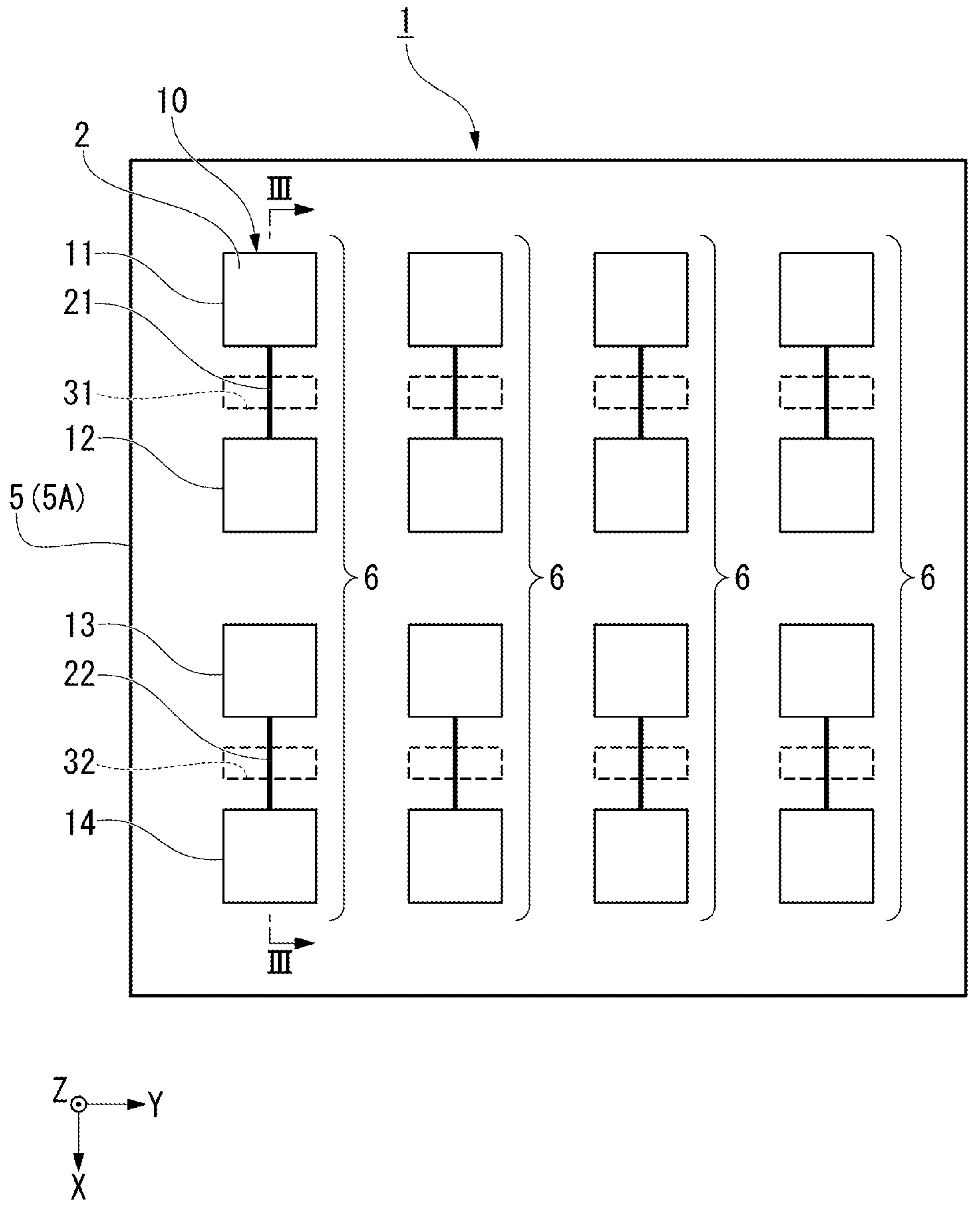
FIG. 1 is a plan view of an antenna layer of an array antenna device according to an embodiment.
Figure 2:
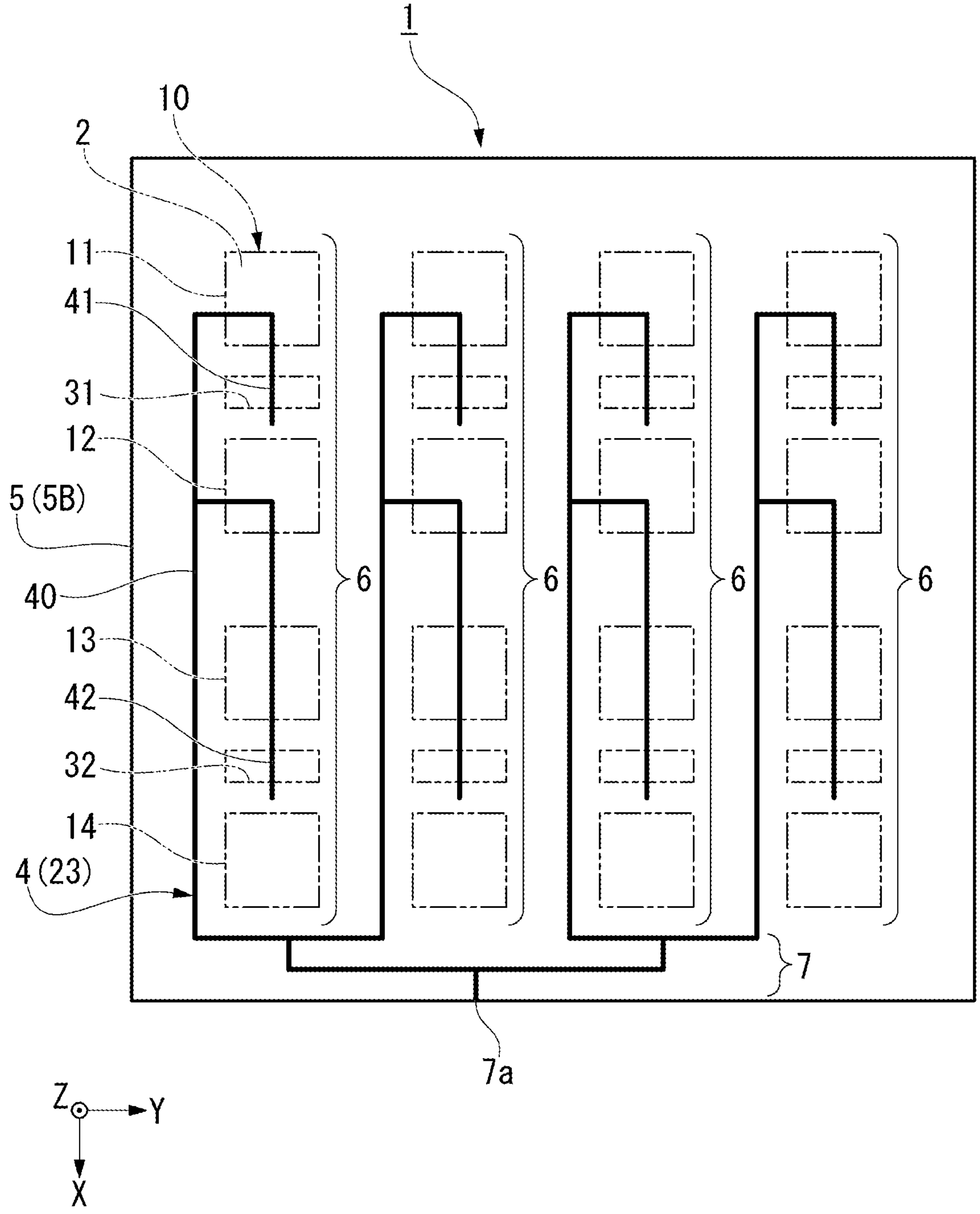
FIG. 2 is a plan view of a feed line layer of an array antenna device according to an embodiment.

FIG. 1 is a plan view of an antenna layer 2 of an array antenna device 1 according to the embodiment. FIG. 2 is a plan view of a feed line layer 4 of the array antenna device 1 according to the embodiment.

Figure 3:
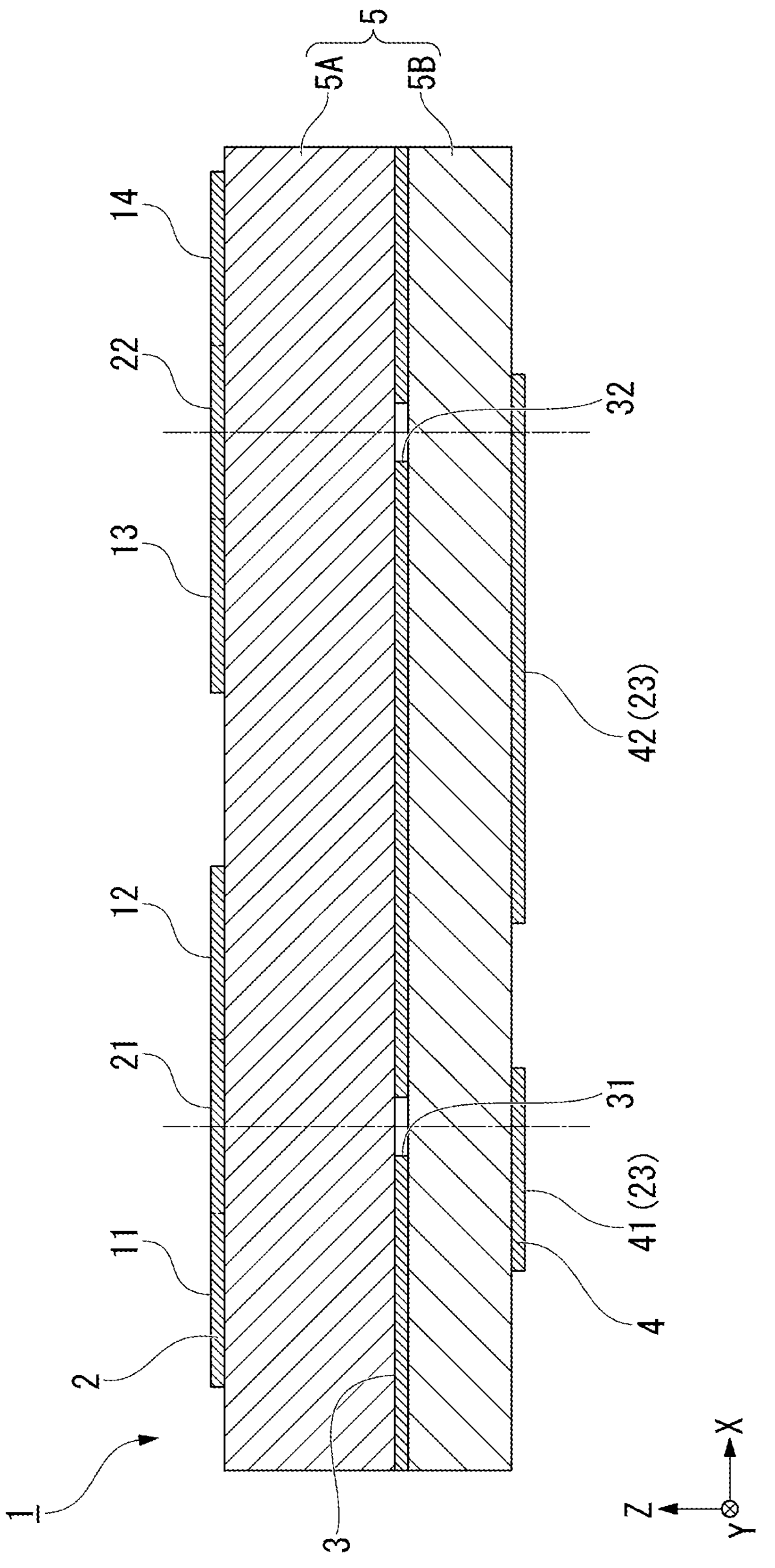
FIG. 3 is a cross-sectional view taken along line III-III shown in FIG. 1.

FIG. 3 is a cross-sectional view taken along line III-III shown in FIG. 1. As shown in FIG. 3, in the array antenna device 1, an antenna layer 2, a ground layer 3, and a feed line layer 4 are stacked in this order. A dielectric layer 5 is sandwiched between the antenna layer 2 and the ground layer 3, and the dielectric layer 5 is sandwiched between the ground layer 3 and the feed line layer 4.

Hereinafter, the dielectric layer 5 sandwiched between the antenna layer 2 and the ground layer 3 is referred to as a first dielectric layer 5A.

Furthermore, the dielectric layer 5 sandwiched between the ground layer 3 and the feed line layer 4 is referred to as a second dielectric layer 5B. Furthermore, a stacking direction of each layer of the array antenna device 1 is referred to as the Z-axis direction, and two axial directions orthogonal to the Z-axis direction and orthogonal to each other are referred to as the X-axis direction (first direction) and the Y-axis direction (second direction).

The X-axis direction includes two directions opposite to each other along the X-axis, unless otherwise specified. The direction along the X-axis indicated by an arrow in the drawing is referred to as the "+X direction," and the direction opposite to the arrow in the drawing is referred to as a "−X direction". Similarly, in the Y-axis direction and the Z-axis direction, unless otherwise specified, two directions opposite to each other along each axis are included. In the drawing, the direction along the Y-axis or Z-axis indicated by an arrow is referred to as the "+Y direction" or the "+Z direction", respectively, and the directions opposite thereto are referred to as the "−Y direction" or the "−Z direction," respectively.

The stacked structure of the array antenna device 1 is manufactured, for example, as follows.

First, a conductor film is formed on a surface facing the +Z direction of the second dielectric layer 5B and a surface facing the −Z direction of the second dielectric layer 5B, and then, the ground layer 3 and the feed line layer 4 are patterned, for example, by etching or the like. Furthermore, the first dielectric layer 5A is bonded onto the ground layer 3 using a resin adhesive or the like. After that, a conductor film is formed on a surface facing the +Z direction of the first dielectric layer 5A, and then, the antenna layer 2 is patterned, for example, by etching or the like.

The antenna layer 2 may be patterned onto the first dielectric layer 5A, and then, the first dielectric layer 5A and the ground layer 3 may be bonded together.

Furthermore, a dielectric layer and a parasitic element layer (not shown) may be stacked on the antenna layer 2 in this order, or a dielectric layer and a ground layer (not shown) may be further stacked under the feed line layer 4 in this order.

Not limited to the above manufacturing method, for example, a conductor film may be formed on each of a surface facing the +Z direction of the first dielectric layer 5A and a surface facing the −Z direction of the first dielectric layer 5A, and then, the antenna layer 2 and the ground layer 3 may be patterned, for example, by etching or the like. Furthermore, after the second dielectric layer 5B is attached under the ground layer 3, a conductor film may be formed on a surface facing the −Z direction of the second dielectric layer 5B, and then the feed line layer 4 may be patterned, for example, by etching or the like.

Furthermore, in the same manner as described above, the dielectric layer and the parasitic element layer may be stacked on the antenna layer 2 in this order, or the dielectric layer and the ground layer may be further stacked under the feed line layer 4 in this order.

By stacking the dielectric layer and the parasitic element layer on the antenna layer 2 in this order, or further stacking the dielectric layer and the ground layer under the feed line layer 4 in this order, it is possible to improve the antenna characteristics and suppress unnecessary radiation.

The first dielectric layer 5A is a flat plate member with defined dielectric constant and layer thickness, depending on the desired antenna characteristics. The first dielectric layer 5A may be composed of a single-layer dielectric or may be composed of a plurality of dielectrics bonded together. Whether the first dielectric layer 5A is a single layer or a plurality of layers may be determined in consideration of, for example, material costs and the like.

The second dielectric layer 5B is a flat plate member provided to separate the ground layer 3 and the feed line layer 4 by a certain insulation distance so that electromagnetic power can be supplied from the feed line layer 4 to the antenna layer 2 through the first slot 31 (second slot 32) described later. The second dielectric layer 5B may also be composed of a single-layer dielectric or may be composed of a plurality of dielectrics bonded together. In addition, in order to improve the power supply efficiency, it is preferable that the dielectric loss tangent of the second dielectric layer 5B is as small as possible.

The antenna layer 2 is formed on a surface facing the +Z direction of the first dielectric layer 5A. The antenna layer 2 forms a planar antenna that is supplied with power by electromagnetic coupling with the feed line layer 4. In the antenna layer 2, as shown in FIG. 1, the first antenna element 11, the second antenna element 12, the third antenna element 13, and the fourth antenna element 14 are arranged in this order in the X-axis direction (first direction) in a plan view. The antenna element row 10 includes the first antenna element 11, the second antenna element 12, the third antenna element 13, and the fourth antenna element 14.

In the present embodiment, an antenna row structure 6, including the antenna element row 10, is formed in four rows with a spacing in the Y-axis direction. In addition, the antenna row structure 6 includes not only the antenna element row 10 but also the first power supply line 21, the second power supply line 22, the first slot 31, the second slot 32, and the third power supply line 23, which will be described later. 16 antenna elements are arranged in a 4×4 square grid arranged in the X-axis direction and the Y-axis direction. The number and arrangement of the antenna elements are merely examples and are not limited to this configuration. Furthermore, the antenna elements are formed in a square shape having sides extending in each of the X-axis direction and the Y-axis direction, but this shape is also an example and is not limited to this configuration.

In addition, parasitic elements (not shown) may be formed in the +Z direction of the first antenna element 11, the second antenna element 12, the third antenna element 13, and the fourth antenna element 14. Accordingly, it is possible to increase the fractional bandwidth.

The first antenna element 11 and the second antenna element 12 are connected to each other by the first power supply line 21 extending in the X-axis direction. The first power supply line 21 connects the intermediate positions in the Y-axis direction of the sides that face each other between the first antenna element 11 and the second antenna element 12. Furthermore, the third antenna element 13 and the fourth antenna element 14 are connected to each other by the second power supply line 22 extending in the X-axis direction. The second power supply line 22 connects the intermediate positions in the Y-axis direction of the sides that face each other between the third antenna element 13 and the fourth antenna element 14.

As shown in FIG. 3, the ground layer 3 is disposed between the first dielectric layer 5A and the second dielectric layer 5B. The ground layer 3 is patterned to be a surface facing the +Z direction of the second dielectric layer 5B and joined to a surface facing the −Z direction of the first dielectric layer 5A. The ground layer 3 is electrically grounded. The first slot 31 (as well as the second slot 32) is a non-conductor portion in the ground layer 3. The first slot 31 (as well as the second slot 32) may be filled with a resin adhesive or the like (not shown).

As shown in FIG. 1, the first slot 31 and the second slot 32 are formed in the ground layer 3. The first slot 31 overlaps with the first power supply line 21 in a plan view and is formed equidistant to the first antenna element 11 and the second antenna element 12 in the X-axis direction. The second slot 32 overlaps with the second power supply line 22 in a plan view and is formed equidistant to the third antenna element 13 and the fourth antenna element 14 in the X-axis direction.

The opening shapes of the first slot 31 and the second slot 32 are formed in a rectangular shape extending in the Y-axis direction in a plan view. The opening shapes of the first slot 31 and the second slot 32 are not limited to these shapes as long as the shapes are designed to match the impedance of the antenna layer 2 and the impedance of the feed line layer 4.

As shown in FIG. 2, the third power supply line 23, which is electromagnetically coupled to the first power supply line 21 and the second power supply line 22 via the first slot 31 and the second slot 32 and supplies power to each antenna element of the antenna element row 10, is formed in the feed line layer 4. The third power supply line 23 is included in each antenna row structure 6 and is formed in four rows in the present embodiment. Each third power supply line 23 is connected equidistantly and in parallel to the power supply point 7*a* by the fourth power supply line 7 branched in a tournament manner. In addition, in a case where a phased array antenna is configured or the like, the power supply point 7*a* may be individually provided corresponding to each third power supply line 23. In this case, an arbitrary phase difference can be given to the antenna element row 10 arranged in parallel to make the beam direction variable.

The third power supply line 23 includes the first branch line 41 overlapping the first slot 31 and the second branch line 42 overlapping the second slot 32, while branching from the extension portion 40 extending in the X-axis direction along the antenna element row 10, in a plan view.

Figure 4:
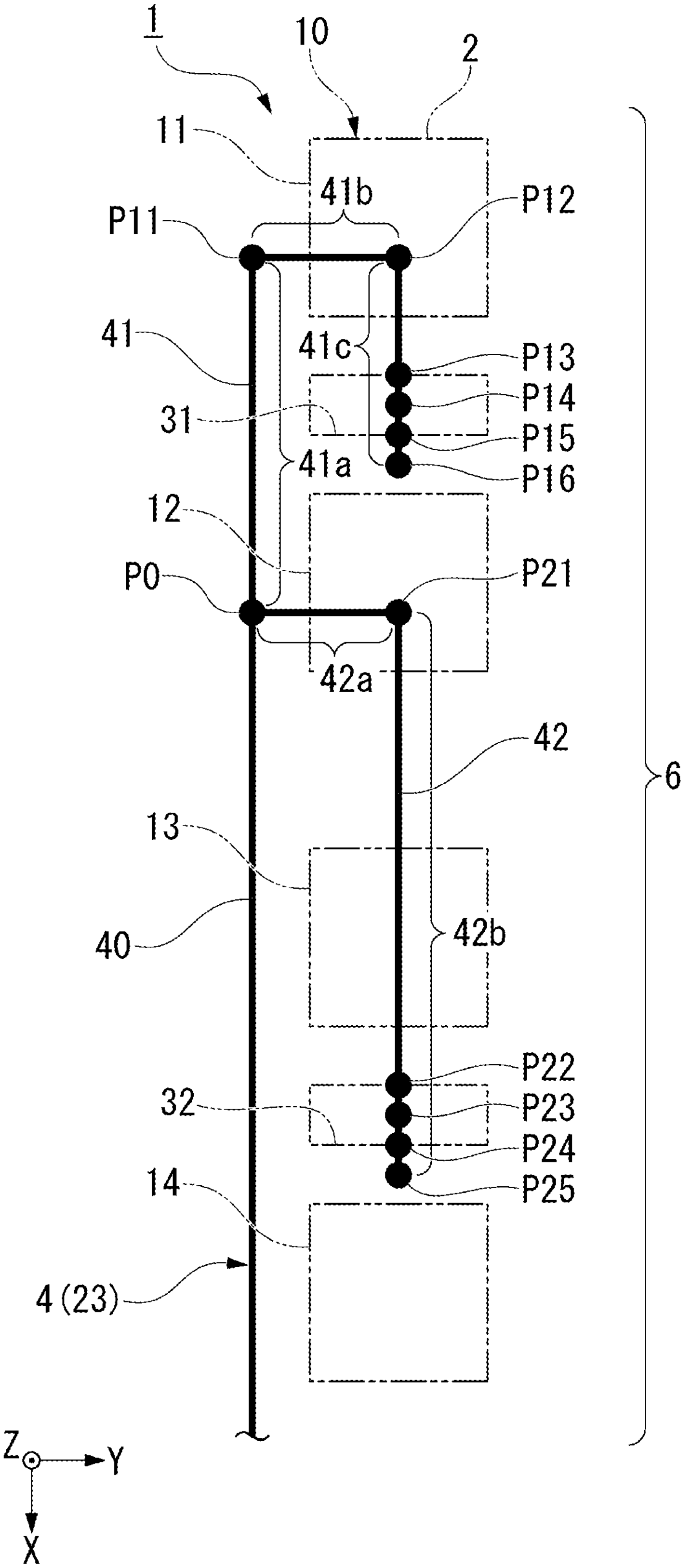
FIG. 4 is an enlarged plan view of a third power supply line according to an embodiment.

FIG. 4 is an enlarged plan view of the third power supply line 23 according to an embodiment.

As shown in FIG. 4, the extension portion 40 of the third power supply line 23 is arranged on one side (first side of the Y direction: −Y direction) of the Y-axis direction (second direction) that intersects the X-axis direction in a plan view, with respect to the antenna element row 10. The extension portion 40 does not overlap the antenna element row 10 and extends parallel to the antenna element row 10 in the X-axis direction in a plan view.

The length of the first branch line 41 branching from the extension portion 40 to the first slot 31 is equal to the length of the second branch line 42 branching from the extension portion 40 to the second slot 32. Furthermore, in a plan view, a direction in which the tip end portion of the first branch line 41 enters the first slot 31 is the direction (+X direction) opposite to the direction (−X direction) in which the extension portion 40 extends in the X-axis. In addition, in a plan view, a direction in which the tip end portion of the second branch line 42 enters the second slot 32 is the direction (+X direction) opposite to the direction (−X direction) in which the extension portion 40 extends in the X-axis.

Here, the length of the first branch line 41 up to the first slot 31 is the length from the branch position P0 with the second branch line 42 to the center position P14 of the first slot 31. In addition, the length of the second branch line 42 up to the second slot 32 is the length from the branch position P0 to the center position P23 of the second slot 32. That is, the length of the first branch line 41 from the branch position P0 to the center position P14 is equal to the length of the second branch line 42 from the branch position P0 to the center position P23.

In addition, the length of the first branch line 41 up to the first slot 31 may be defined by the length from the branch position P0 to the entrance position P13 or the exit position P15 of the first slot 31. In addition, the length of the second branch line 42 up to the second slot 32 may be defined by the length from the branch position P0 to the entrance position P22 or the exit position P24 of the second slot 32. With any position as a reference, the length of the first branch line 41 up to the first slot 31 is equal to the length of the second branch line 42 up to the second slot 32.

The first branch line 41 includes a first straight line portion 41*a* extending from the branch position P0 with the second branch line 42 to one side (first side of the X direction: −X direction) in the same X-axis direction as the extension portion 40, a second straight line portion 41*b* bending and extending to the other side of the Y-axis direction (second side of the Y direction: +Y direction) with respect to the first straight line portion 41*a*, and a third straight line portion 41*c* bending and extending from the second straight line portion 41*b* to the other side (second side of the X direction: +X direction) in the X-axis direction.

The first straight line portion 41*a* and the second straight line portion 41*b* do not overlap the first slot 31 in a plan view, and the third straight line portion 41*c* overlaps the first slot 31 in a plan view. An angle formed between the first straight line portion 41*a* and the second straight line portion 41*b* is 90°. Furthermore, an angle formed between the second straight line portion 41*b* and the third straight line portion 41*c* is 90°.

On the other hand, the second branch line 42 includes the fourth straight line portion 42*a* bending and extending from the branch position P0 to the other side (+Y direction) in the Y-axis direction with respect to the extension portion 40, and the fifth straight line portion 42*b* bending and extending from the fourth straight line portion 42*a* to the other side (+X direction) in the X-axis direction.

The fourth straight line portion 42*a* does not overlap the second slot 32 in a plan view, and the fifth straight line portion 42*b* overlaps the second slot 32 in a plan view. An angle formed between the extension portion 40 and the first straight line portion 41*a* is 90°. Furthermore, an angle formed between the fourth straight line portion 42*a* and the fifth straight line portion 42*b* is 90°.

In the present embodiment, the length of the second straight line portion 41*b* is equal to the length of the fourth straight line portion 42*a*. The total length of the first straight line portion 41*a* and the third straight line portion 41*c* is equal to the length of the fifth straight line portion 42*b*. Here, the length of the first straight line portion 41*a* is the length from the branch position P0 to the first bending position P11 of the first branch line 41. In addition, the length of the second straight line portion 41*b* is the length from the first bending position P11 to the second bending position P12 of the first branch line 41.

The length of the third straight line portion 41*c* is the length from the second bending position P12 to the tip end position P16 of the first branch line 41. Furthermore, the length of the fourth straight line portion 42*a* is the length from the branch position P0 to the bending position P21 of the second branch line 42. In addition, the length of the fifth straight line portion 42*b* is the length from the bending position P21 of the second branch line 42 to the tip end position P25 of the second branch line 42.

That is, the length from the first bending position P11 to the second bending position P12 of the first branch line 41 is equal to the length from the branch position P0 of the second branch line 42 to the bending position P21 of the second branch line 42. In addition, the sum of the length from the branch position P0 to the first bending position P11 of the first branch line 41 and the length from the second bending position P12 to the tip end position P16 of the first branch line 41 is equal to the length from the bending position P21 to the tip end position P25 of the second branch line 42.

Furthermore, the tip end portion of the first branch line 41 extends across the first slot 31 and the tip end portion of the second branch line 42 extends across the second slot 32, and the length of a tip of the first branch line 41 from across the first slot 31 is equal to the length of a tip of the second branch line 42 from across the second slot 32. Here, the length of a tip of the first branch line 41 from across the first slot 31 is the length from the exit position P15 of the first slot 31 to the tip end position P16 of the first branch line 41. In addition, the length of a tip of the second branch line 42 from across the second slot 32 is the length from the exit position P24 of the second slot 32 to the tip end position P25 of the second branch line 42.

Next, the operation of the array antenna device 1 of the present embodiment will be described.

Figure 5:
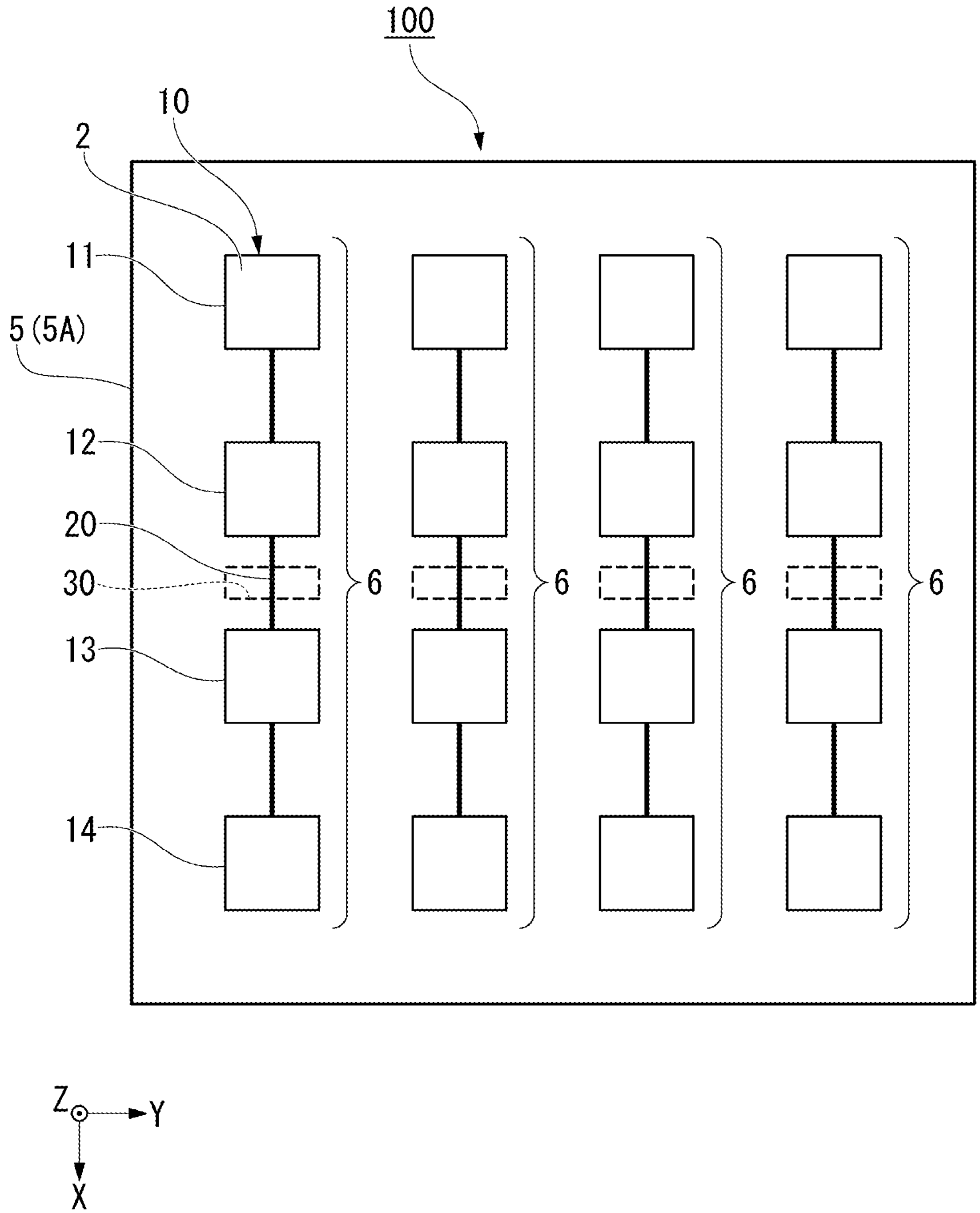
FIG. 5 is a plan view of an antenna layer of an array antenna device according to a comparative example.
Figure 6:
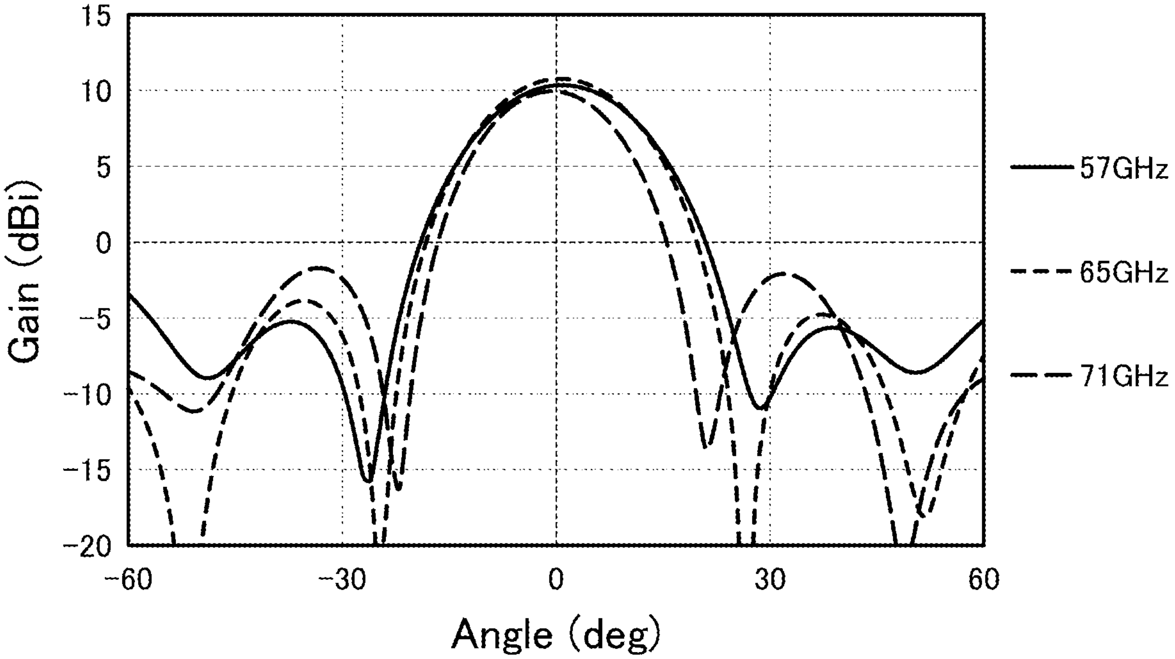
FIG. 6 is a graph showing the antenna characteristics of an array antenna device according to an embodiment.
Figure 7:
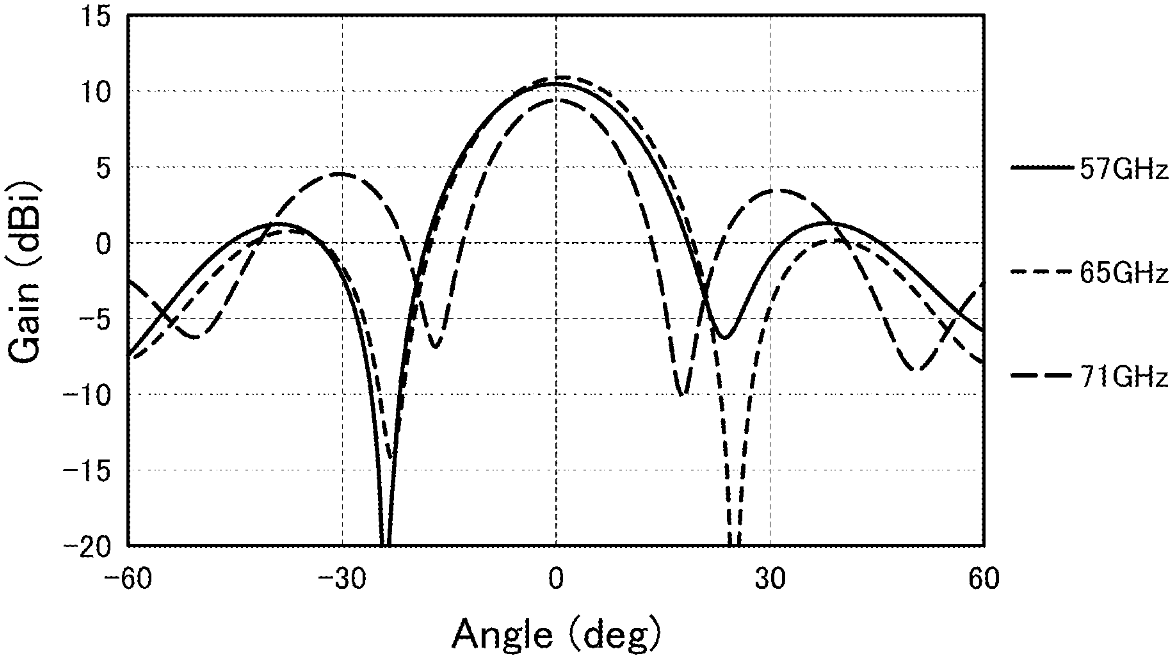
FIG. 7 is a graph showing the antenna characteristics of an array antenna device according to a comparative example.

FIG. 5 is a plan view of an antenna layer 2 of an array antenna device 100 according to a comparative example. FIG. 6 is a graph showing the antenna characteristics of the array antenna device 1 according to an embodiment. FIG. 7 is a graph showing the antenna characteristics of the array antenna device 100 according to a comparative example. In FIGS. 6 and 7, the horizontal axis is the elevation angle θ (degrees) with respect to the XY plane, and the vertical axis is the gain (dBi). Furthermore, FIGS. 6 and 7 show the antenna characteristics of the one-row antenna row structure 6 of the array antenna devices 1 and 100.

First, the array antenna device 100 of the comparative example for description in comparison with the array antenna device 1 will be described.

As shown in FIG. 5, in the array antenna device 100 of the comparative example, the antenna element row 10 is connected in series by one power supply line 20 extending in the X-axis direction. Furthermore, in the array antenna device 100 of the comparative example, one slot 30 that overlaps the power supply line 20 in a plan view is provided between the second antenna element 12 and the third antenna element 13. In this slot 30, one unbranched third power supply line 23 is arranged to overlap with the feed line layer 4, in a plan view (not shown).

As shown in FIG. 6, according to the array antenna device 1 of the present embodiment, it can be seen that the side lobes are reduced and the stable gain is obtained at least between 57 GHz and 71 GHz, compared with the array antenna device 100 of the comparative example shown in FIG. 7. This is because, as shown in FIG. 4, the third power supply line 23 extending in the X-axis direction is branched in the feed line layer 4, and the first branch line 41 is made to take a slight detour to pass through the first slot 31 before folding back, the second branch line 42 is made to take a slight detour to pass through the second slot 32 before folding back, thereby simplifying the routing of the third power supply line 23 and supplying the power to the first slot 31 and the second slot 32 from equidistance and the same direction. As a result, in the antenna layer 2 shown in FIG. 1, since the power can be supplied to the separate antenna elements in a direction opposite to each other at branches from the first slot 31 and the second slot 32, and all of the antenna elements are supplied with the power in parallel, it is possible to supply the power to the antenna elements in the same phase at all frequency, so that the antenna characteristics are improved.

In this way, according to the array antenna device 1 according to the present embodiment, the antenna layer 2, the ground layer 3, and the feed line layer 4 are stacked in this order, with the dielectric layer 5 sandwiched between the antenna layer 2 and the ground layer 3, and between the ground layer 3 and the feed line layer 4. In the antenna layer 2, the first antenna element 11, the second antenna element 12, the third antenna element 13, and the fourth antenna element 14 are arranged in this order in the X-axis direction (first direction) in a plan view, and the antenna element row 10 includes the first antenna element 11, the second antenna element 12, the third antenna element 13, and the fourth antenna element 14. The first antenna element 11 and the second antenna element 12 are connected via the first power supply line 21 extending in the X-axis direction, and the third antenna element 13 and the fourth antenna element 14 are connected via the second power supply line 22 extending in the X-axis direction. The first slot 31 that overlaps the first power supply line 21 and is formed equidistant from the first antenna element 11 and the second antenna element 12 in the X-axis direction, in a plan view, and the second slot 32 that overlaps the second power supply line 22 and is formed equidistant from the third antenna element 13 and the fourth antenna element 14 in the X-axis direction, in a plan view are formed in the ground layer 3. The third power supply line 23 that is electromagnetically coupled to the first power supply line 21 and the second power supply line 22 via the first slot 31 and the second slot 32 and supplies power to each antenna element of the antenna element row 10 are formed in the feed line layer 4. The third power supply line 23 includes the first branch line 41 overlapping the first slot 31 and the second branch line 42 overlapping the second slot 32, while branching from the extension portion 40 extending in the X-axis direction along the antenna element row 10, in a plan view. The length of the first branch line 41 up to the first slot 31 is equal to the length of the second branch line 42 up to the second slot 32. Furthermore, in a plan view, a direction in which the tip end portion of the first branch line 41 enters the first slot 31 and a direction in which the tip end portion of the second branch line 42 enters the second slot 32 are directions (+X direction) opposite to the direction (−X direction) in which the extension portion 40 extends in the X-axis direction.

According to this configuration, as shown in FIG. 6, the antenna characteristics of the array antenna device 1 can be improved.

Furthermore, in the array antenna device 1 of the present embodiment, as shown in FIG. 2, the extension portion 40 of the third power supply line 23 is arranged on one side of the Y-axis direction (second direction) that intersects the X-axis direction in a plan view, with respect to the antenna element row 10. According to this configuration, even in a case where the antenna row structure 6 including the third power supply line 23 is arranged in parallel with a spacing in the Y-axis direction, it can be laid out such that the adjacent third power supply lines 23 are not close to each other. As a result, electromagnetic interference between the third power supply lines 23 can be suppressed.

In addition, in the array antenna device 1 of the present embodiment, as shown in FIG. 4, the first branch line 41 includes a first straight line portion 41*a* extending from the branch position P0 with the second branch line 42 to one side (−X direction) in the same X-axis direction as the extension portion 40, a second straight line portion 41*b* bending and extending to the other side of the Y-axis direction (+Y direction) with respect to the first straight line portion 41*a*, and a third straight line portion 41*c* bending and extending from the second straight line portion 41*b* to the other side (+X direction) in the X-axis direction. The second branch line 42 includes the fourth straight line portion 42*a* bending and extending from the branch position P0 to the other side (+Y direction) in the Y-axis direction with respect to the extension portion 40, and the fifth straight line portion 42*b* bending and extending from the fourth straight line portion 42*a* to the other side (+X direction) in the X-axis direction. According to this configuration, the power can be supplied to the first slot 31 and the second slot 32 from equidistance and the same direction while minimizing the number of times of bending of the first branch line 41 and the second branch line 42.

Furthermore, in the array antenna device 1 of the present embodiment, as shown in FIG. 4, the length of the second straight line portion 41*b* is equal to the length of the fourth straight line portion 42*a*, and the total length of the first straight line portion 41*a* and the third straight line portion 41*c* is equal to the length of the fifth straight line portion 42*b*. According to this configuration, since the widths of the first branch line 41 and the second branch line 42 in the Y-axis direction are the same, it is not necessary to excessively widen the spacing in the Y-axis direction of the antenna row structure 6.

In addition, in the array antenna device 1 of the present embodiment, in a plan view, the tip end portion of the first branch line 41 extends across the first slot 31 and the tip end portion of the second branch line 42 extends across the second slot 32, and the length of a tip of the first branch line 41 from across the first slot 31 is equal to the length of a tip of the second branch line 42 from across the second slot 32. According to this configuration, since the length of a tip of the first branch line 41 from across the first slot 31 and the length of a tip of the second branch line 42 from across the second slot 32 are the same, the reflection loss is reduced compared with the case where the lengths thereof are different.

Furthermore, in the array antenna device 1 of the present embodiment, a plurality of antenna row structures 6, including the antenna element row 10, the first power supply line 21, the second power supply line 22, the first slot 31, the second slot 32, and the third power supply line 23, are arranged in parallel in a plan view. According to this configuration, the antenna elements can be arranged in a planar shape to easily control the antenna directivity.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description and is only limited by the scope of the appended claims.

REFERENCE SIGNS LIST

1: Array antenna device
2: Antenna layer
3: Ground layer
4: Feed line layer
5: Dielectric layer
5A: First dielectric layer
5B: Second dielectric layer

6: Antenna row structure
7: Fourth power supply line
7*a*: Power supply point
10: Antenna element row
11: First antenna element
12: Second antenna element
13: Third antenna element
14: Fourth antenna element
20: Power supply line
21: First power supply line
22: Second power supply line
23: Third power supply line
30: Slot
31: First slot
32: Second slot
40: Extension portion
41: First branch line
41*a*: First straight line portion
41*b*: Second straight line portion
41*c*: Third straight line portion
42: Second branch line
42*a*: Fourth straight line portion
42*b*: Fifth straight line portion
100: Array antenna device
P0: Branch position
P11: First bending position
P12: Second bending position
P13: Entrance position
P14: Center position
P15: Exit position
P16: Tip end position
P21: Bending position of second branch line
P22: Entrance position
P23: Center position
P24: Exit position
P25: Tip end position

What is claimed is:

1. An array antenna device comprising:

an antenna layer;

a ground layer; and a feed line layer, wherein the antenna layer, the ground layer, and the feed line layer are stacked in this order, with a dielectric layer sandwiched between the antenna layer and the ground layer, and a dielectric layer sandwiched between the ground layer and the feed line layer, a first antenna element, a second antenna element, a third antenna element, and a fourth antenna element are arranged in the antenna layer in this order in a first direction in a plan view, and an antenna element row includes the first antenna element, the second antenna element, the third antenna element, and the fourth antenna element, the first antenna element and the second antenna element are connected via a first power supply line extending in the first direction, the third antenna element and the fourth antenna element are connected via a second power supply line extending in the first direction, a first slot and a second slot are formed in the ground layer, the first slot overlapping the first power supply line and the first slot being formed equidistant from the first antenna element and the second antenna element, in a plan view, and the second slot overlapping the second power supply line and the second slot being formed equidistant from the third antenna element and the fourth antenna element, in a plan view, a third power supply line is formed in the feed line layer, the third power supply line being electromagnetically coupled to the first power supply line via the first slot, the third power supply line being electromagnetically coupled to the second power supply line via the second slot, and the third power supply line supplying power to each antenna element of the antenna element row, the third power supply line includes an extension portion extending in the first direction along the antenna element row, a first branch line overlapping the first slot and a second branch line overlapping the second slot in a plan view, the first branch line and the second branch line branching from the extension portion, a length of the first branch line up to the first slot is equal to a length of the second branch line up to the second slot, in a plan view, a direction in which a tip end portion of the first branch line enters the first slot is opposite to a direction in which the extension portion extends in the first direction, and in a plan view, a direction in which a tip end portion of the second branch line enters the second slot is opposite to a direction in which the extension portion extends in the first direction.

2. The array antenna device according to claim 1, wherein the extension portion of the third power supply line is arranged on a first side of a second direction intersecting the first direction in a plan view, with respect to the antenna element row.

3. The array antenna device according to claim 2, wherein the first branch line includes a first straight line portion extending from a branch position with the second branch line to a first side of the first direction which is the same direction where the extension portion extends, a second straight line portion bending and extending to a second side of the second direction with respect to the first straight line portion, and a third straight line portion bending and extending from the second straight line portion to a second side of the first direction, and the second branch line includes a fourth straight line portion bending and extending from the branch position to the second side of the second direction with respect to the extension portion, and a fifth straight line portion bending and extending from the fourth straight line portion to the second side of the first direction.

4. The array antenna device according to claim 3, wherein a length of the second straight line portion is equal to a length of the fourth straight line portion, and a total length of the first straight line portion and the third straight line portion is equal to a length of the fifth straight line portion.

5. The array antenna device according to claim 1, wherein in a plan view, the tip end portion of the first branch line extends across the first slot, and the tip end portion of the second branch line extends across the second slot, and a length of a tip of the first branch line from across the first slot is equal to a length of a tip of the second branch line from across the second slot.

6. The array antenna device according to claim 1, wherein a plurality of antenna row structures including the antenna element row, the first power supply line, the second power supply line, the first slot, the second slot, and the third power supply line are arranged in parallel in a plan view.

* * * * *